March 27, 1951 E. L. SNYDER 2,546,910
ELECTRIC TOASTER
Filed Jan. 2, 1948 3 Sheets-Sheet 2

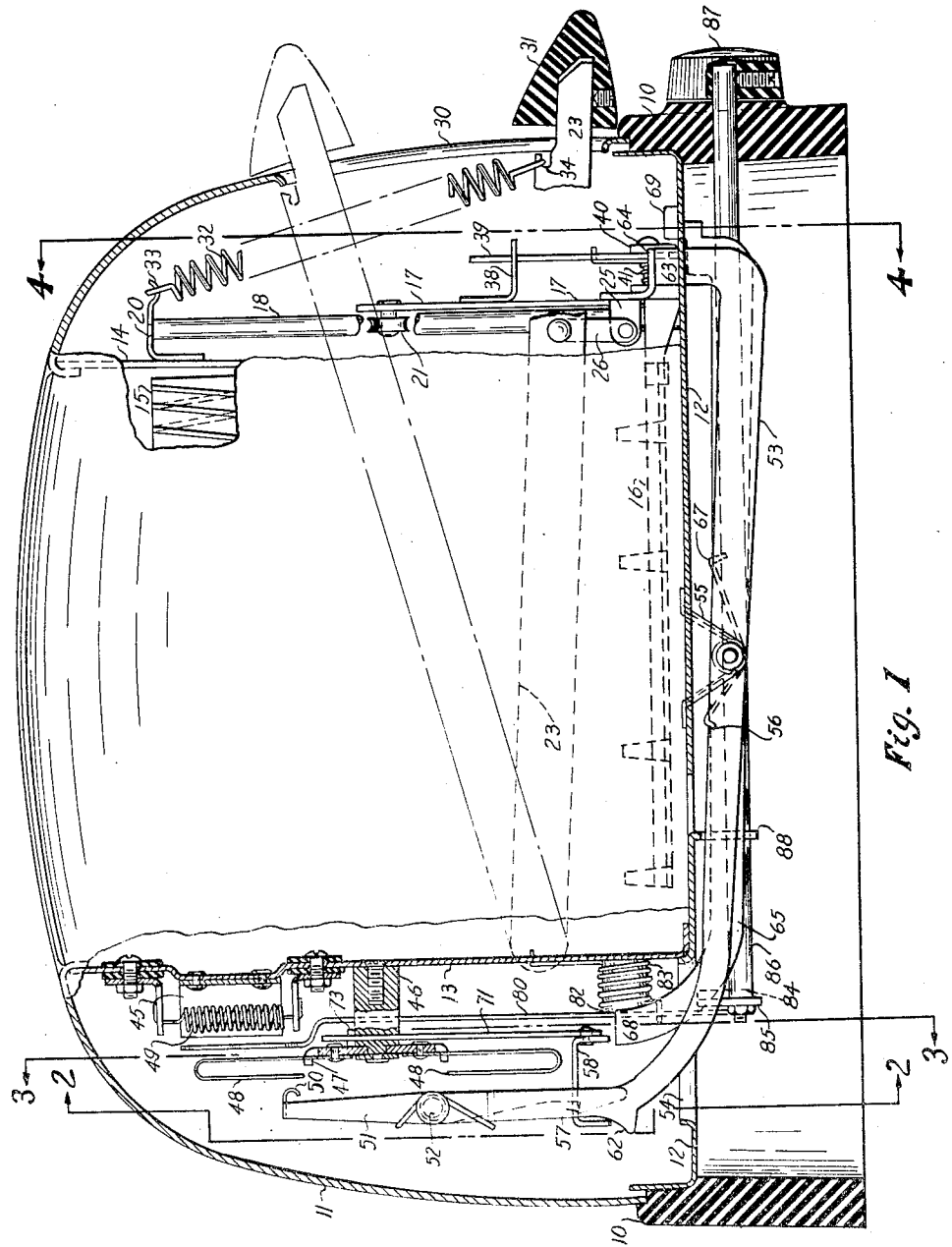

INVENTOR.
Eugene L. Snyder
BY
ATTORNEY.

March 27, 1951  E. L. SNYDER  2,546,910
ELECTRIC TOASTER
Filed Jan. 2, 1948  3 Sheets-Sheet 3

INVENTOR.
*Eugene L. Snyder*
BY *Harry G. Duncare*
ATTORNEY.

Patented Mar. 27, 1951

2,546,910

UNITED STATES PATENT OFFICE 2,546,910

ELECTRIC TOASTER

Eugene L. Snyder, Fort Lauderdale, Fla., assignor to The Hoover Company, North Canton, Ohio, a corporation of Ohio Application January 2, 1948, Serial No. 261

6 Claims. (Cl. 99—329)

The present invention relates to the art of electric cooking appliances and more particularly to electrically energized bread toasting devices of the type in which a timing mechanism operates to de-energize the toaster heating element and to eject the toast partially from the toasting chamber when the toasting operation is completed.

In a more specific sense the present invention proposes an electric toaster timing mechanism provided with a plurality of small light weight control thermostatic devices which are successively indexed into operating position upon initiation of successive toasting or operating cycles of the machines. The aforesaid thermostatic mechanism operates to release a light resistance latch mechanism which in turn triggers off a more powerful mechanism to operate the toast ejecting mechanism.

It is customary practice in this art to release the toast carriage hold down latch directly by the action of a control thermostat. This requires an appreciable force because the hold down latch operates against the springs which raise the toast carriage to toast ejecting position. Because of the force required, prior devices have been compelled to utilize powerful thermostats to operate the latch. In some devices the thermostat is of the direct expansion or flexure type and in others it is of the over-center snap acting type. In all of the foregoing mentioned types of thermostats the energy required to release the latch is ultimately derived from the means utilized to apply heat to the thermostat. Due to the powerful thermostats required by prior constructions and the requirement that the latch releasing energy be supplied by the thermostat heater large heating elements and powerful thermostats have been the rule.

The present invention overcomes the objections to prior toaster controls arising from the use of large thermostat heaters and powerful thermostats. In the present invention the operator supplies the energy which releases the carriage hold down latch by tensioning what amounts to a spring impactor when the toast carriage is moved to toasting position. The thermostat then operates only a small trigger which releases the impactor which in turn supplies the energy to operate the carriage hold down latch. By this means the thermostat and auxiliary heater can be constructed from much lighter weight elements than those required by prior constructions.

Various other novel features and constructions characterizing the present invention will become apparent as the description proceeds when taken in connection with the accompanying drawings in which:

Figure 1 is a side elevational view along the line 1—1 of Figure 2 looking in the direction of the arrows of a bread toasting device embodying the present invention;

Figure 3:
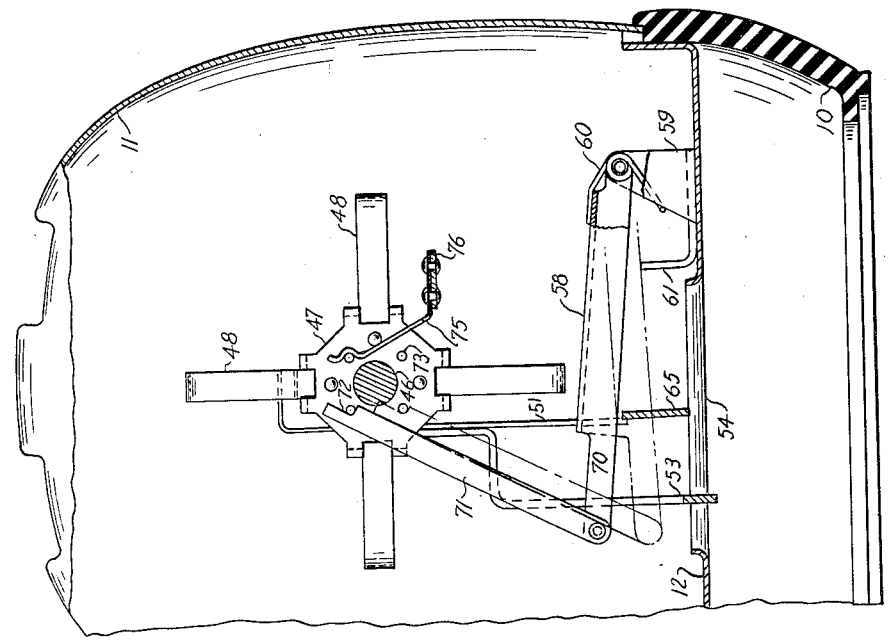
Figure 3 is a view similar to Figure 2 taken along the line 3—3 of Figure 1 looking in the direction of the arrows.

Referring now to the drawing in detail and more particularly to Figure 1 thereof the toaster mechanism is supported upon a base member 10 which may be made of heat resistant plastics. A cover shell 11 encases the toasting mechanism and is suitably secured to the upper edge of the base 10. A crumb tray and bottom plate 12 is secured to the upper portion of the base 10 by any desired means, not shown. Upstanding dividing wall plates 13 and 14 at the left hand and right hand ends of the toaster structure, respectively, as viewed in Figure 1, define the end walls of the toasting chambers which house the heating elements 15 and toast carriages 16.

The toast carriages 16 are rigidly supported upon a carriage guide plate 17. The carriage guide plate 17 is slidably mounted upon upstanding guide posts 18 which are rigidly secured at their lower ends to the toaster frame plate 12 and at their upper ends to a bracket 20. The bracket 20 is secured to the end plate 14 of the toasting chamber. The supports for the toast carriages 16 extend through slots provided therefor in the end wall 14.

The carriage guide plate 17 carries four grooved rollers 21 which engage the post 18 to position and guide the plate 17.

Toast carriage operating levers 23 are pivotally mounted upon plate 13 at each side of the toasting chamber. The levers 23 extend the full length of the toasting chamber and pass through slots 24 formed in the end plate 14 of the toasting chamber. The toast carriage supporting and guide plate 17 is provided with a laterally projecting wing 25 (see Fig. 4) which is connected to the left hand lever 23, as viewed in Fig. 4, by a link 26. The guide plate 17 is also provided with a laterally projecting wing 28 which is connected to the right hand lever 23, as viewed in Fig. 4, by a link 27 corresponding to the link 26 on the opposite side of the toaster. The two levers 23 curve inwardly in front of the toast carriage supporting plate 17 and the associated control mechanism, to be described hereinafter, until they join at the central portion of the toaster. The levers 23 then project through a slot 30 formed in the toaster chamber 11 and are secured to an insulating actuating handle 31 on the exterior of casing 11.

A tension spring 32 extends between a hook 33 on the plate 20 and a hook 34 formed on the joined ends of the levers 23. This spring tends to force levers 23, links 26 and 27, the toast carriage supporting plate 17 and its supported toast carriages 16 upwardly to their uppermost, toast ejecting, position at which point the upper edges of levers 23 engage the upper edges of slots 24 to stop the upward movement thereof. The upper position of levers 23 is indicated in dot-dash lines in Figure 1.

Figure 4:
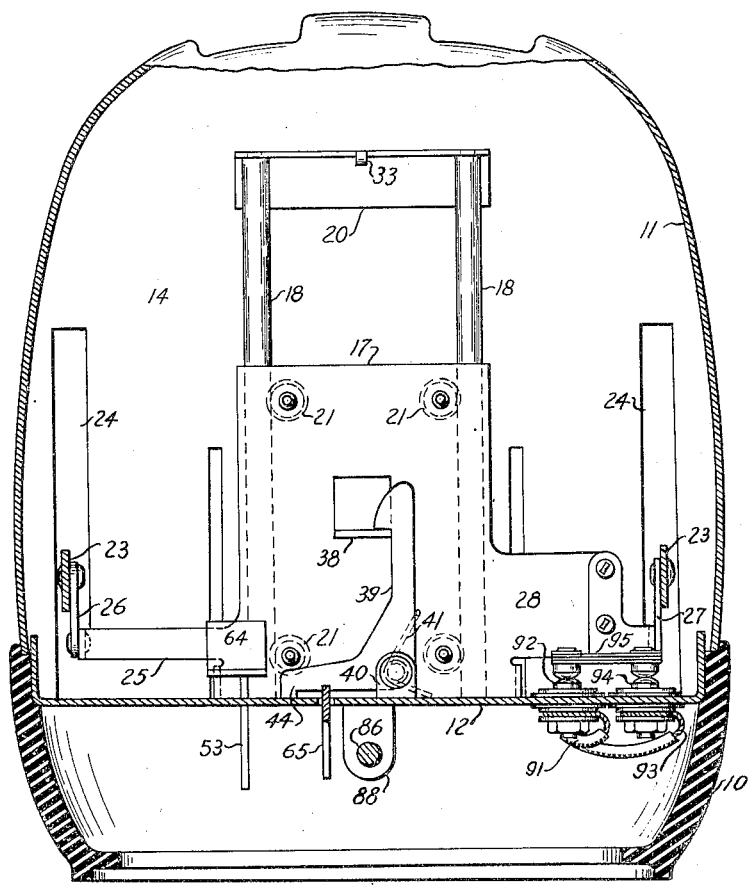
Figure 4 is a view similar to Figure 2 taken along the line 4—4 of Figure 1 looking in the direction of the arrows.

The toast supporting carriage 17 carries a latching lug 38 which is in position to be engaged and secured by a latch 39 when the plate 17 is in its lowermost position as shown in Fig. 4.

The latch 39 is in the form of a bell crank lever pivoted upon ears 40 secured to the plate 12 of the toaster frame. A torsion spring 41 urges the latch 39 in a counter-clockwise direction as viewed in Fig. 4 so as to cause the same to engage with the latch retaining lug 38. Counter-clockwise movement of the latch 39 is limited by engagement between the horizontal arm 44 of the latch and the plate 12.

The timing mechanism proper for the toaster is mounted in the left hand thereof, as viewed in Fig. 1, in the space provided between the end wall 13 of the toasting chamber and the end wall of the cover shell 11. A post 46 secured to the wall 13 and projecting into the aforementioned space pivotally carries a thermostat indexing wheel 47 upon its end. Four light weight bimetallic thermostats 48 are secured to the wheel 47 and project radially thereof 90° apart. In the position shown, the uppermost vertically extending thermostat 48 is positioned to be subjected to the heat from an auxiliary heating coil 49 insulatably supported upon the wall 13. A reflector 45 is mounted on the wall 13 behind the heater 49 to reflect the heat thereof onto the thermostat 48.

Figure 2:
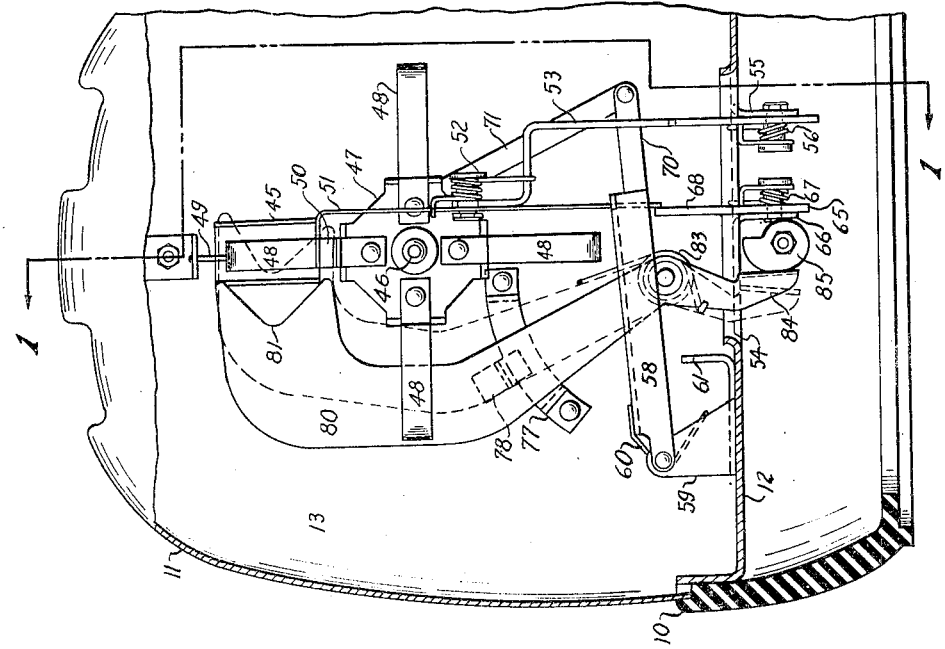
Figure 2 is an end sectional elevational view taken along the line 2—2 of Figure 1 looking in the direction of the arrows.

The thermostats 48 are U-shaped with the free ends thereof positioned remotely from the heating element. When the thermostat responds to the heat of the heating element 49 the free end flexes in clockwise direction as viewed in Fig. 1 until it strikes an abutment surface 50 on the end of a trigger or latch lever 51. The latch 51 is pivotally mounted at 52 upon the off-set end (see Fig. 2) of a supporting lever 53. The supporting lever 53 extends through a slot 54 formed in the frame plate 12 of the toaster structure and is pivotally mounted beneath the toast chamber upon a supporting ear 55 secured to the plate 12. A spring 56 urges the lever 53 in a counter-clockwise direction as viewed in Fig. 1. A stop ear 62 is formed on lever 53 to engage the plate 12 and limit counter-clockwise movement of lever 53 by spring 56. The lower end of trigger 51 is formed with a latch surface 57. The latch surface 57 is engageable with the under surface of a channel shaped striker lever 58 pivotally mounted on bracket 59 secured to plate 12. A torsion spring 60 urges the lever 58 in a clockwise direction against the latch 57 as viewed in Fig. 2. Movement of lever 58 in a clockwise direction as viewed in Fig. 2 is limited by a stop lug 61.

The lever 53 extends the full length of the toaster chamber and is provided with an upturned end 63 which abuts a stop lug 64 carried upon the toaster carriage frame plate 17.

A latch release lever 65 is pivotally mounted upon a bracket 66 secured to the under side of plate 12. A torsion spring 67 urges the lever 65 in a clockwise direction as viewed in Fig. 1. The lever 65 has an upturned end 68 passing through the slot 54 and terminating just below the lever 58 in position to be engaged by the down-turned flange thereof. The forward end of the lever 65 projects through a suitable slot in the plate 12 beneath the horizontal leg 44 of the latch 39 and in a position to engage the same. This end of the lever 65 also carries a projecting portion 69 which engages the upper base of the plate 12 and limits clockwise rotation of the lever 65.

The pivoted striker lever 58 has a projecting arm 70 which pivotally supports a drive link 71 at its outer end. The link 71 is provided at its outer end with a notch 72 which engages drive pins 73 projecting from the rear or heater side of the face of the wheel 47. This arrangement is such that oscillatory movement of lever 58 will index the thermostats 48 and plate 47 about the pivotal support 46 with a step by step motion as the successive pins 73 are engaged by notch 72 of link 71.

A small leaf spring 75 is supported by a lug 76 carried by the plate 13 and engages one of the pins 73 at its outer end to prevent movement of plate 47 except under the impetus of the link 71.

A temperature adjusting mechanism for varying the effect of the heater 49 upon whichever thermostat 48 happens to be in operative relation thereto is also provided. This mechanism takes the form of a shield plate 80 having a notch or V-shaped end 81 in position to be moved between the thermostat 48 and heating element 49. The shield plate 80 is pivotally mounted upon a supporting post 82 carried by the plate 13. A torsion spring 83 urges the shield plate 80 in a counter-clockwise direction about its pivot as viewed in Fig. 2. A guide sector 77 is mounted on plate 13 in off-set relation thereto to slidably engage one face of the shield 80. A slider 78 is secured to the shield 80 and engages the face of the sector 77 remote from the plate 80. This structure steadies the shield and insures that it will not contact the reflector 45 or the thermostats 48. The plate 80 is also provided with a drive shoe 84 which extends through the slot 54 in the plate 12 and bears against an adjusting cam 85. The adjusting cam 85 is mounted upon the end of an adjusting shaft 86 which projects through the front wall of base 10 of the toaster directly beneath the hand grip 31. An adjusting dial 87 is secured upon the outer end of the shaft 86. The shaft is journalled in supporting brackets 88 attached to the underside of the plate 12. Rotation of the shaft 86 operates cam 85 which pivots the shield plate 80 to move the V-shaped notch 81 into cooperative relation with the heater and thermostat to vary the extent of the heating element 49 to which the thermostat 48 is directly exposed. Thus by regulating the quantity of heat received by the thermostat per unit of time its time period of operation is correspondingly adjusted. This adjusts the apparatus for light or dark toast as desired.

Figure 5:
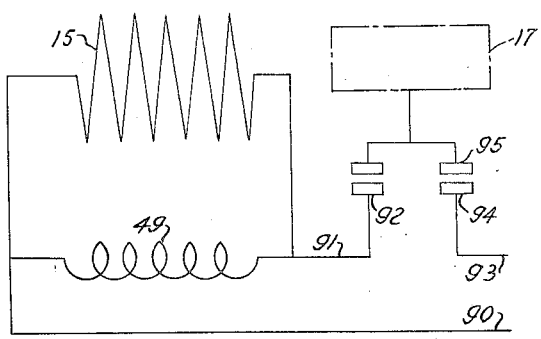
Figure 5 is a schematic wiring diagram of the electrical connections for the toaster.

A schematic wiring diagram of the apparatus is shown in Fig. 5. Heating elements 15 and 49 are both directly connected to the line wire 90 and are both connected by conductor 91 to a stationary electrical contact 92. The other line wire 93 is directly connected to a stationary contact 94 positioned closely adjacent the stationary contact 92. A movable contact element 95 carried by the toast carriage supporting structure 17 bridges the gap between stationary contacts 92 and 94 and closes the circuit as long as the toast carriage supporting plate 17 is in its lower latched position.

Referring now to Fig. 4 the switch structure is shown at the right hand side thereof. The stationary contacts 92 and 94 are mounted on the base plate 12 of the toaster structure. The bridge contact 95 is carried by the right hand side wing 28 of the carriage structure 17. The mounting for the bridge contact 95 is insulated to prevent current leakage through the toaster frame structure and it also has a slight spring so that the contact 95 bridges contacts 92 and 94 before latch 39 engages the lug 38 to latch the toast carriage structure in toasting position. This insures energization of the main heaters and timer heater 49 throughout the toasting period.

In the operation of the instant toaster the same is connected to a source of electrical energy by a conventional service cord. As long as the toast carriage is held in its upper toast ejecting position by the spring 32 the circuit is broken at contacts 92 and 94. If now bread to be toasted is inserted in the heating chamber upon the carriages 16, handle 31 is brought to its lowermost position as shown in Fig. 1. The handle 31 carries the lever 23 downwardly with it which depresses the toast carriage supporting and guide plate 17 and the toast rack 16 to lowermost position until the spring latch 39 engages the lug 38 to latch the toast carriage in its lowermost position with the spring 32 fully tensioned and the bridge contact 95 closing the circuit between contacts 92 and 94. This energizes the main heaters 15 and the timing heater 49.

As the toast carriage moves downwardly the lug 64 on the carriage plate 17 strikes the end 63 of lever 53 rocking the same in a clockwise direction against the tension of the spring 56. This action raises the secondary release latch 51 vertically and causes the latch end 57 thereof to engage the lever 58 and rock the same in a counter-clockwise direction, as viewed in Fig. 2, against the bias of the torsion spring 60. Counter-clockwise rotation of the lever 58 raises the link 71 which is in contact with one of the pins 73 and causes the thermostat supporting wheel to rotate through an arc of 90° to bring a new thermostat into juxtaposed relation to the auxiliary heater 49. As the pin 73 is snapped by the retaining spring 75 this element acts to secure the wheel and its associated thermostatic elements in the final position to which they are moved by the link 71 and to prevent accidental displacement thereof. The lug 64 bearing on the end 63 of lever 53 retains the lever 53 in the position shown in Figs. 1 to 4 as long as the toast carriage is in its lower toasting position.

As the thermostat 48 which is in juxtaposed relation to the heating element 49 gradually heats, the free end thereof flexes to the left, as viewed in Fig. 1, until it engages the contact face 50 of lever 51. Eventually the pressure of the thermostat 48 rocks the lever 51 about its pivot on lever 53 against the bias of the spring 52 sufficiently to disengage the latching end 57 of the lever from the pivoted link 58. When this occurs link 58 snaps downwardly in a clockwise direction, as viewed in Fig. 2, until it strikes the fixed stop 61. This movement of the link 58 causes one of the down turned flanges thereof to strike the up-turned end 68 of the lever 65 with a hammer blow. This hammer blow pivots the lever 58 against the bias of the torsion spring 67. The lever system 58, 65 and 39 has sufficient lost motion or play to allow levers 58 and 65 to gain momentum by moving appreciably before striking latch 39. This insures delivery of a sharp blow to latch 39 to release the toast carriage. When this occurs the spring 32 raises the toaster carriage to its uppermost position as indicated in dot-dash lines in Fig. 1 and breaks the electrical circuit by raising bridge contact 95 from contacts 92 and 94. The toasting period is now complete.

As the lever 58 rotates in a counter-clockwise direction, as viewed in Fig. 3, to strike the latch release lever 65 it also shifts the link 71 from the full line position of Fig. 3 to the dot-dash line position of that figure thus causing the link to engage a new pin 73 to be prepared to rotate the wheel 47 and to remove the previously heated thermostat 48 from operative relation to the heater 49 and to shift a cold thermostat into such position upon the next succeeding lowering and latching operation of the main toast carriage.

The torsion spring 41, which urges the latch 39 into latching position, and the torsion spring 67 which urges the lever 65 into position to be engaged by the hammer lever 58 are very weak possessing only sufficient force to move their respective individual elements in the desired direction. The spring 60 which biases lever 58 possesses sufficient strength to overcome the effect of both the foregoing springs so that the latch 39 is retained in non-latching position as long as the toast carriage is in elevated position. As the toast carriage is brought down by the lowering handle the lug 64 engages lever 53 and lifts lever 58 before the latch lug 38 is low enough to be engaged by the latch 39. Thus the latch is ready to perform its intended function when the toast supporting carriage reaches its lowermost position.

At the end of any toasting period the carriage is in its uppermost position, the electrical circuit is broken, the main latch actuating lever 65 is held in its latch releasing position by the lever 58 and spring 60. The secondary latch carrying lever 53 is in its rotated position being held in such position by the bias of torsion spring 67 with the stop 62 engaging the edge of the opening 54.

During the interval between successive toasting cycles the heater 49 and previously heated thermostat 48 are cooled to some degree however when a new toasting cycle is initiated the previously heated thermostat is swung away from the heating element and a new thermostat which has had at least three successive toasting cycles within which to cool is brought into heating relation with the heating element 49. The long cooling period provided by the successive use of the thermostats and the light weight of the thermostats insures that each thermostat will be at the temperature of the end chamber of the toaster when it is shifted into operating position.

By reason of the above construction the thermostats cool to some temperature considerably above the ambient temperature when the toaster is used successively because the conditions within the end chamber housing the thermostat approximate those prevailing in the toasting oven in the interval between successive toasting cycles so that the thermostat tends progressively to shorten the time period of energization of the heating element 15 as the interior ambient temperature conditions of the toaster structure increase. This compensates the toaster for the heat carry-over between successive cycles and produces toast for the uniform color and consistency.

Considerable force is required to release latch 39 from latch lug 38 because of the pressure between the two induced by the comparatively powerful toast carriage elevating spring 32. The thermostat 48 however is not required to develop anything approaching the force required to release latch 39. The thermostat 48 operates the secondary latch system 51—57 against a small resistance compared to that required by the latch 39. The requisite energy for releasing latch 39 is developed by the momentum of the parts acting under the bias of the spring 60 which moves it an appreciable distance before the linkage strikes the hammer blow upon the bottom leg of the latch 39 and suddenly drives the same off the latch retaining lug 38.

Various modifications may be made in the construction and arrangements of the parts hereof without departing from the spirit of the invention or the scope of the appended claims.

I claim:

1. In a toaster having an oven, a toast carriage in said oven, means supporting said carriage for movement between toasting and toast ejecting positions, means biasing said carriage to toast ejecting position, a latch for holding said carriage in toasting position, a plurality of thermostats mounted in spaced relation upon a movable support, a heating element positioned adjacent said support to apply heat to one of said thermostats at a time, an impacting mechanism spring biased for movement in a direction to release said latch with a hammer blow, means operated by said toast carriage when moving to toasting position for stressing the biasing spring of said impacting mechanism and for shifting said thermostat support a distance sufficient to bring a thermostat unheated during an immediately preceding toasting operation into heating relation to said heating element, and trigger means operated by the heated thermostat for releasing said impacting mechanism and said thermostat support shifting means from said toast carriage.

2. A toaster comprising an oven, electrical heating elements in said oven, a toast rack in said oven, a cover shell enclosing said oven and spaced from the ends thereof to form chambers therewith, means for supporting said toast rack movably mounted in one of said chambers, means biasing said supporting means to toast ejecting position, a plurality of thermostatic elements mounted on a rotary support in the other of said chambers, said thermostats extending radially of said support, an auxiliary electrical heating element mounted laterally adjacent the path of movement of said thermostats to apply heat to any one of said thermostats which may stop adjacent thereto, an electrical switch connected to control the energization of said heating elements mounted in said one chamber, said switch having a part mounted on said toast rack supporting means operative to open circuit said switch when said toast rack is moved to toast ejecting position, a latch in said one chamber for holding said rack supporting means in toasting position, a spring biased striker lever in said other chamber, a follower lever pivotally supported beneath said oven having one end positioned to be engaged by said striker lever and its other end positioned to engage and release said latch, a drive link pivotally supported beneath said oven having one end positioned to be engaged by said toast rack supporting means as it moves to toasting position, the other end of said drive link extending into said other chamber, a trigger on said other end of said drive link positioned to pick up said striker lever against the bias of its biasing spring as said drive link is moved by said toast rack supporting means, said trigger having a part positioned to be operated by the thermostat which is subject to the heat of said auxiliary heating element to release said striker lever from said trigger, and means operated by said striker lever as it is moved by said trigger to rotate said thermostat support to bring a new thermostat into heating relation to said auxiliary heating element.

3. Toasting apparatus comprising an oven, heating elements in said oven, a toast carriage mounted for movement from a bread toasting position to a toast ejecting position, means for urging said toast carriage to said toast ejecting position, means for releasably latching said toast carriage in toasting position, timing means for governing the period of energization of said heating means including a thermostat, means for heating said thermostat, means for energizing said heating means when said carriage is in toasting position, means for releasing said latching means including a spring hammer, a trigger for tensioning and releasing said spring hammer normally positioned to engage said spring hammer, means operated by movement of said toast carriage to toasting position for moving said trigger to tension said spring hammer and to position said trigger to be released by heat induced movement of said thermostat, and means biasing said trigger to said normal position.

4. Toasting apparatus comprising an oven, heating elements in said oven, a toast carriage mounted for movement from a bread toasting position to a toast ejecting position, means for urging said toast carriage to said toast ejecting position, means for releasably latching said toast carriage in toasting position, timing means for governing the period of energization of said heating means including a plurality of light bimetallic thermostats, means movably supporting said thermostats, a thermostat heating means, mechanism forming a spring hammer arranged to strike said latching means with sufficient force to release said toast carriage, means arranged to cock said spring hammer and to operate said movable means to shift a cool thermostat into heating relation to said thermostat heating means when said toast carriage is moved to toasting position and means operated by the thermostat in heating relation to said heating means for releasing said spring hammer to terminate a toasting period.

5. A toaster comprising an oven, an electrical heating element for heating said oven, a control mechanism for governing the operation of said heating element comprising an auxiliary heating element, a switch controlling the energization of said heating elements, means urging said switch to open circuit position, a latch for holding said switch in closed circuit position, a plurality of thermostats, a rotatable support, said thermostats being secured to said rotatable support in spaced relation, said support being so mounted in relation to said auxiliary heating element that said thermostats are movable into and out of heating relation to said auxiliary heating element one at a time as said support is rotated, an indexing mechanism operatively connected to said support to rotate said support sufficiently to advance one thermostat into heating relation with said auxiliary heating element at each actuation of said indexing mechanism, a spring hammer for releasing said latch, a trigger for tensioning and releasing said spring hammer, manually operated means for simultaneously closing said switch, actuating said indexing mechanism and moving said trigger to tension said spring hammer and to position said trigger to be operated by the thermostat in heating relation to said auxiliary heater to release said spring hammer.

6. A toaster comprising an oven, a toast carriage movable between toasting and ejecting positions, means biasing said carriage to ejecting position, means for moving said carriage to toasting position against said biasing means, a latch for holding said carriage in toasting position, a thermostatic timer for said toaster of the type in which the thermostat moves to a predetermined position to terminate a toasting period, a latch release means comprising a striker structure having a movably mounted part positioned to be moved into engagement with said latch to release said toast carriage to the action of said biasing means, a striker member movably mounted to move into contact with said movably mounted part, means biasing said striker member into contact with said movably mounted part, a lever having a part positioned to be engaged by said toast carriage as it is moved to toasting position, a trigger carried by another part of said lever and positioned to engage and lift said striker member away from said movably mounted part against the action of said biasing means and to position said trigger to be operated by said thermostat to release said striker member as said toast carriage moves to toasting position, and means for actuating said lever to position said trigger in engaging relation to said striker member immediately said carriage is moved to toast ejecting position.

EUGENE L. SNYDER.

REFERENCES CITED

The following references are of record in the file of this patent:

UNITED STATES PATENTS

| Number | Name | Date |
|---|---|---|
| 1,988,230 | Avery | Jan. 15, 1935 |
| 2,132,622 | Ireland | Oct. 11, 1938 |
| 2,284,450 | Sardeson | May 26, 1942 |
| 2,439,017 | Meyers | Apr. 6, 1948 |